United States Patent [19]

Schmitt et al.

[11] 3,719,288

[45] March 6, 1973

[54] ARTICLE HANDLING APPARATUS

[75] Inventors: Robert A. Schmitt; Gary W. Betts; Forrest H. Johnson; Lloyd Carlson, all of Vancouver, Wash.

[73] Assignee: Columbia Machine, Inc., Vancouver, Wash.

[22] Filed: Aug. 2, 1971

[21] Appl. No.: 168,175

[52] U.S. Cl. ....214/16.4 C, 214/16.4 A, 214/16.4 R, 198/163
[51] Int. Cl. ................................................B65g 1/06
[58] Field of Search........214/16.4 R, 16.4 A, 16.4 C; 198/163

[56] References Cited

UNITED STATES PATENTS

| | | | |
|---|---|---|---|
| 2,502,940 | 4/1950 | Gelbman | 214/16.4 C |
| 3,593,862 | 7/1971 | Pierson | 214/16.4 R |

*Primary Examiner*—Gerald M. Forlenza
*Assistant Examiner*—R. Johnson
*Attorney*—Kolisch, Hartwell & Dickinson

[57] ABSTRACT

Apparatus for loading articles in a substantially continuous single-file stream onto the infeed end, of a selected rack in a set of vertically stacked racks. The apparatus includes an infeed conveyor for moving articles horizontally and in succession into a region below the infeed ends of the racks. An elevator lifts articles in succession directly from the infeed conveyor and raises them to a position adjacent the infeed end of the selected rack. A shifter, which is vertically adjustable to different positions adjacent the infeed ends of different racks, is operable to move articles off the elevator and onto the selected rack. A transfer mechanism, adjustable to a position adjacent the outfeed end of the selected rack, receives articles discharged from the rack and shifts them vertically onto an outfeed conveyor below the outfeed ends of the racks. The racks are disposed in side-by-side sets and the shifter, elevator, and transfer mechanism are movable between different sets. Control means connected to the elevator, shifter, and transfer mechanism moves them automatically as required between selected sets and between selected racks in the sets.

20 Claims, 7 Drawing Figures

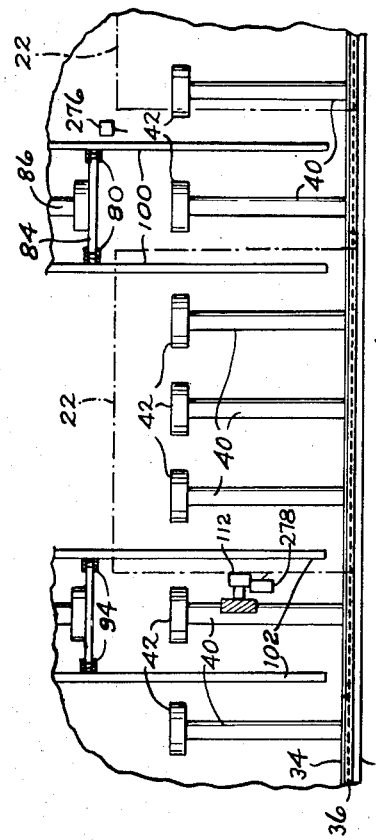
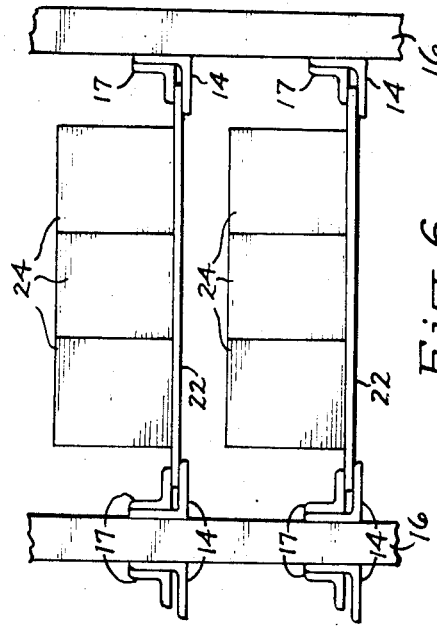
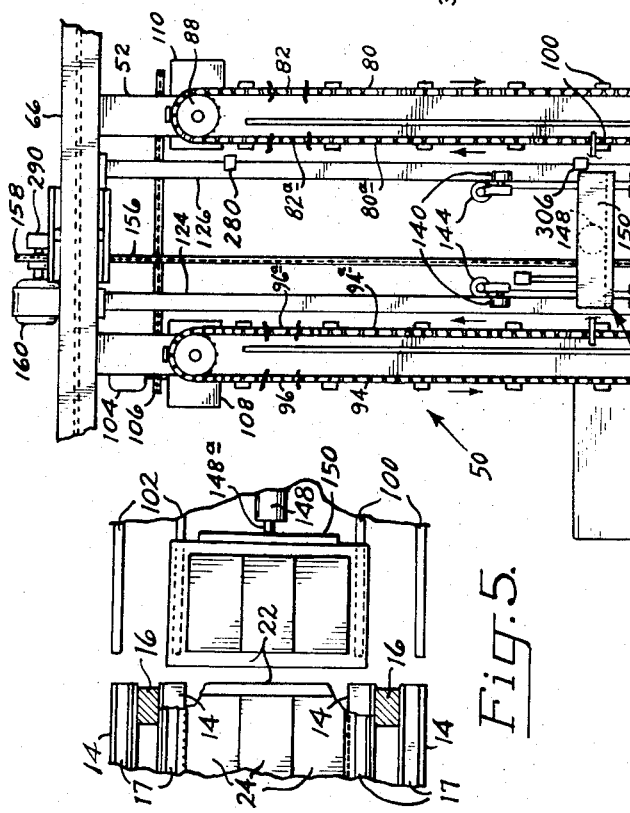
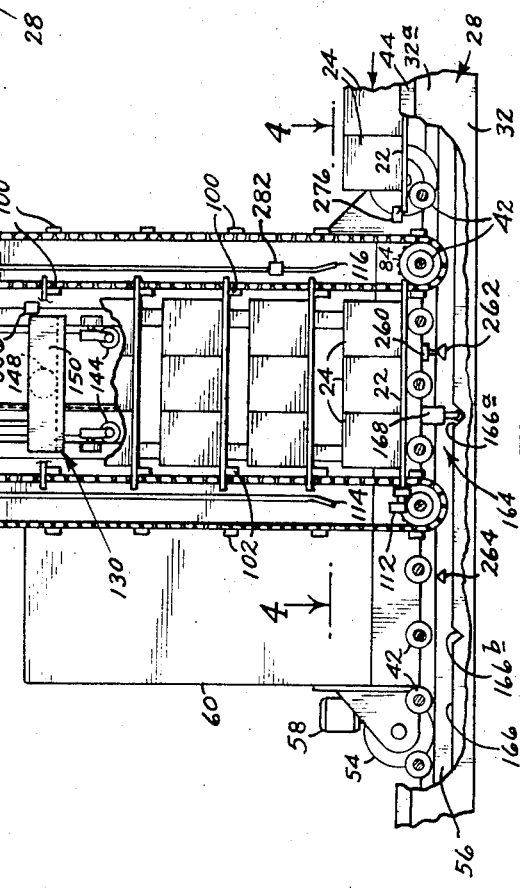

ARTICLE HANDLING APPARATUS

BACKGROUND AND SUMMARY OF THE INVENTION

This invention relates to apparatus for loading and unloading articles from vertically stacked racks.

In the manufacture and/or warehousing of certain articles, it is often necessary to support the articles on vertically stacked, horizontal racks. An example of this is found in the manufacture of concrete blocks. Such block, after being formed in a block making machine, may be placed, in an uncured state, on sheet metal pallets. The block-laden pallets generally then are conveyed, one after another, to sets of elongated, vertically stacked racks within a kiln onto which they may be loaded for curing. When moving such pallett-supported blocks, they should travel in a manner whereby they remain substantially horizontal. If they are moved in a substantially inclined position there is a possibility that the blocks may shift on the pallet with resultant damage to the blocks.

A general object of the invention is to provide novel apparatus for quickly and efficiently loading and unloading articles on vertically stacked racks in a substantially continuous single-file stream.

Another object of the invention is to provide novel apparatus for loading articles onto vertically stacked racks, which apparatus is operable to maintain the articles in substantially horizontal position as they are operated upon.

More specifically, an object is to provide such novel apparatus which includes an infeed conveyor for moving articles along a substantially horizontal path into a position spaced below the infeed set of ends of the racks, an elevator for lifting the articles in succession directly from the infeed conveyor and raising them along a substantially vertical path to a position adjacent the infeed end of a selected rack, and a shifter for moving the articles horizontally from the elevator and onto the selected rack.

Another object is to provide such novel apparatus which includes means for sensing when a preselected number of articles have been shifted in a single-file stream onto a rack and power-operated means operable to move the shifter vertically into alignment with another rack after such preselected number of articles have been shifted onto the first-mentioned rack.

Yet another object is to provide in such apparatus power-operated means for moving the shifter and elevator laterally of the ends of racks, whereby, after the racks in one set have been loaded, the elevator and shifter may be moved to an adjacent set to fill the racks therein.

Still another object is to provide such apparatus which also includes transfer means adjacent the outfeed ends of the racks operable to receive articles discharged from the racks, and to lower the articles onto an outfeed conveyor spaced below the outfeed ends of the racks. Also included is control means, which interconnects the shifter and transfer means, whereby the transfer means is maintained adjacent the outfeed end of the rack with which the shifter is aligned.

A still further object is to provide novel apparatus which includes an elevator having multiple, vertically spaced article-supporting flights operable to lift articles directly from the infeed conveyor, and the article-supporting flights of the elevator are spaced apart vertically a distance only slightly greater than the height of an article to be lifted from the conveyor. With this construction, a more rapid loading operation is possible.

BRIEF DESCRIPTION OF THE DRAWINGS

These and other objects and advantages of the invention will become more fully apparent as the following description is read in conjunction with the drawings, wherein:

FIG. 3 is a view, taken generally along the line 3—3 in FIG. 2, of infeed mechanism in the apparatus;

FIG. 4 is an enlarged view taken generally along the line 4—4 in FiG. 3 with pallets on a roller conveyor therein illustrated in dot-dashed outline;

FIG. 5 is a view taken generally along the line 5—5 in FIG. 2;

FIG. 6 is an enlarged view taken generally along the line 6—6 in FIG. 2; and

DETAILED DESCRIPTION OF THE INVENTION

Figure 1:
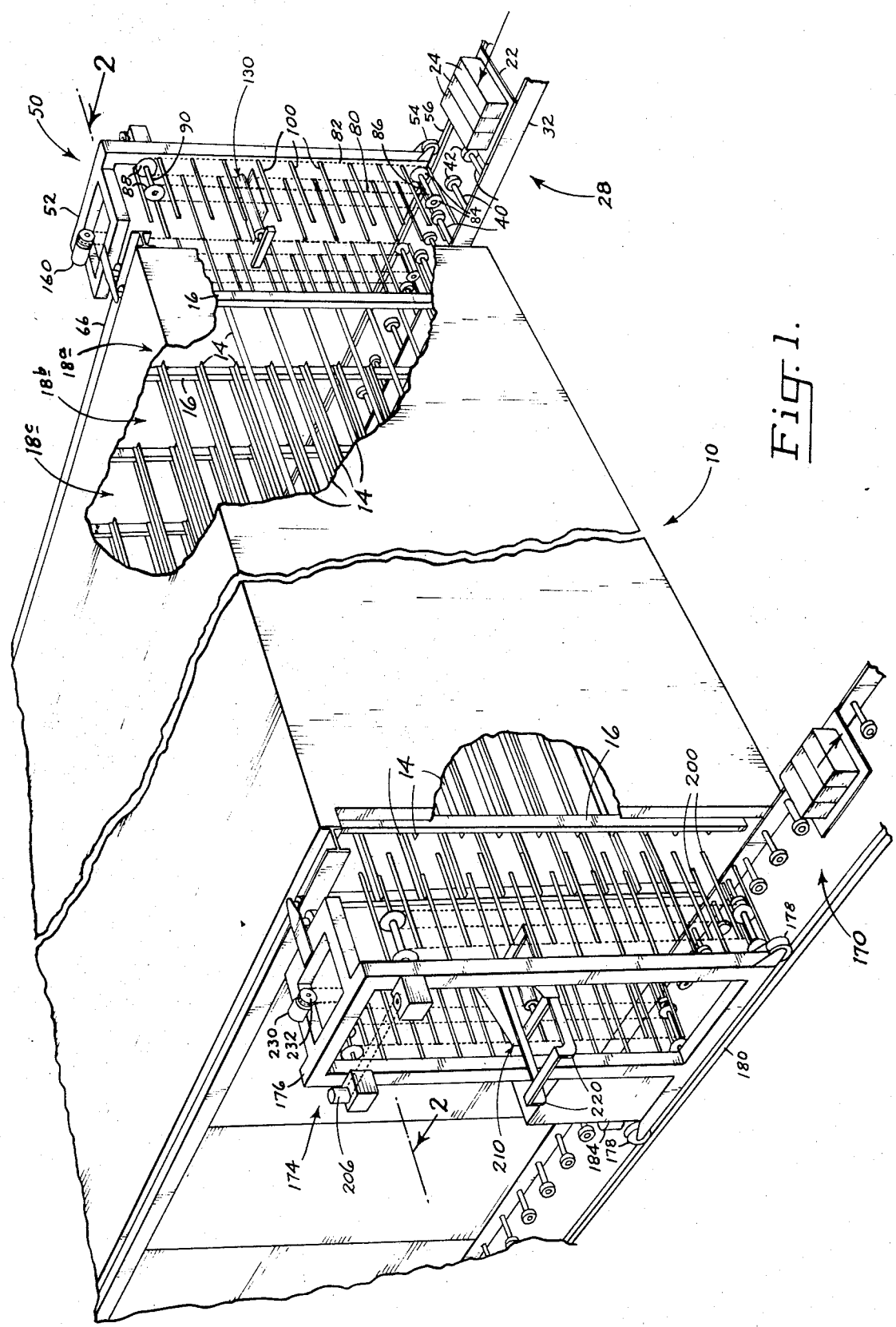
FIG. 1 is a perspective view, with portions broken away, of article-handling apparatus according to the invention as viewed from the discharge, or outfeed, ends of a plurality of elongated article-support racks in a kiln.

Referring now to the drawings, and first specifically to FIG. 1, at 10 is indicated generally a kiln into which concrete blocks supported on sheet pallets may be loaded for curing. The infeed end of the kiln is spaced away from the viewer in the figure, and the outfeed, or discharge, end is near the viewer.

Portions of the top and side walls of the kiln have been broken away to illustrate a plurality of substantially horizontal, elongated angle members 14 which extend the full length of the kiln. The angles are secured to and supported in vertically and horizontally spaced relationship on upright columns 16 in the kiln. (see FIGS. 3, 5 and 6 also).

Figure 2:
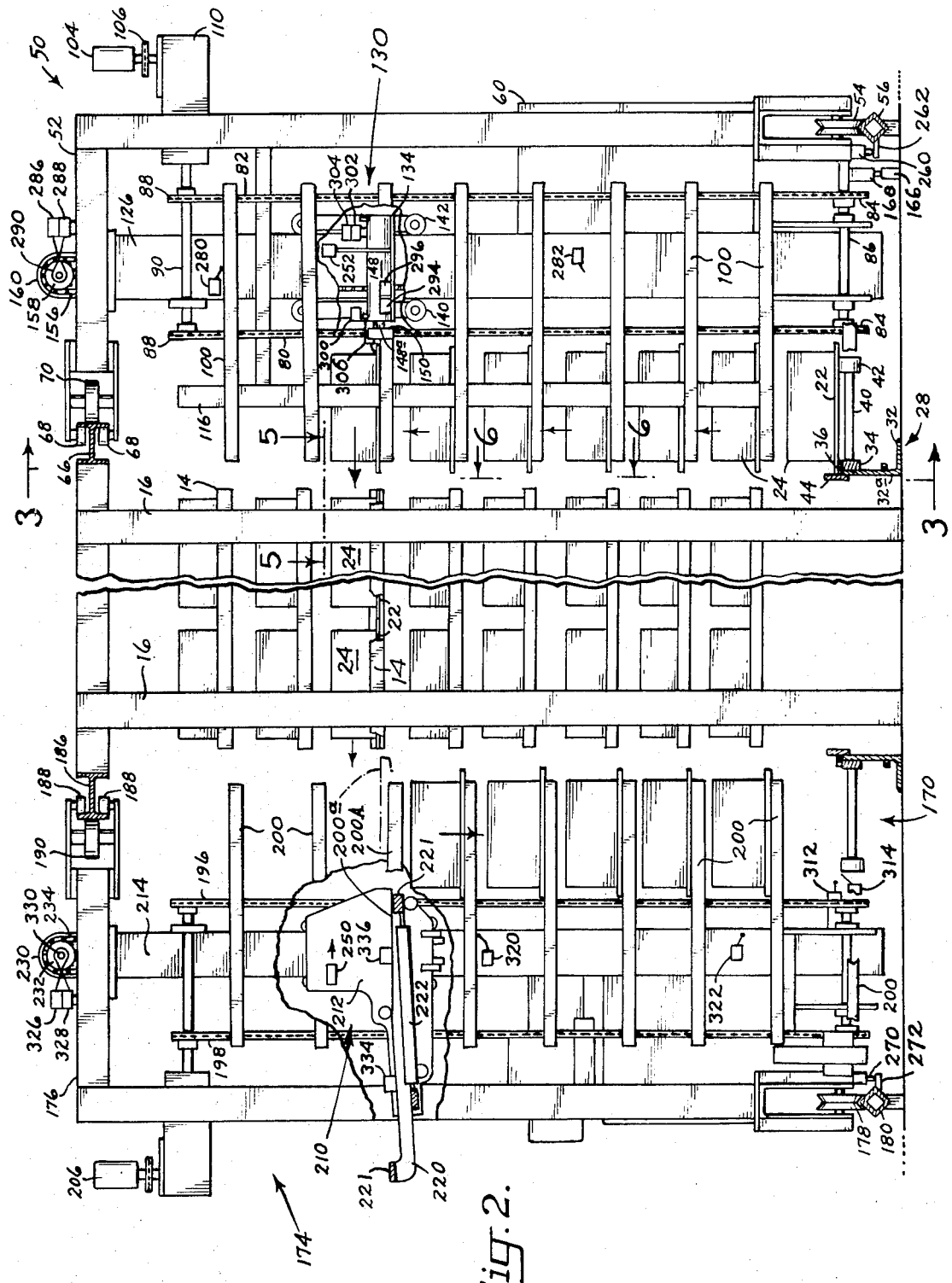
FIG. 2 is a view taken generally along the line 2—2 in FIG. 1, somewhat enlarged and with portions broken away.

The angles are so disposed in the kiln that they form a plurality of vertically stacked, horizontal racks adapted to support opposite edges of rectangular sheet metal pallets, indicated generally at 22, which carry concrete blocks 24 (see FIGS. 2 and 5). The vertical spacing between the angles is slightly greater than the combined height of the pallets and their associated blocks which are to be loaded in the kiln (see FIGS. 2 and 6). As is best seen in FIG. 6, angle members 17 are secured in positions directly above each of angle members 14. The horizontal flanges of angles 17 are spaced above and extend parallel to the horizontal flanges of members 14. The space between the flanges of angles 14, 17 is sufficient to slidably receive a pallet therebetween, but is narrow enough to prevent an edge of one pallet from riding up and onto an adjacent pallet on the rack.

The stacks of racks are disposed in multiple side-by-side sets indicated generally at 18a, 18b, 18c. The racks have infeed ends (farthest from the viewer in FIG. 1, and at the right end in FIG. 2) and outfeed, or discharge, ends (nearest the viewer in FIG. 1 and at the left end in FIG. 2). Each rack in a set is at substantially the same elevation as a rack on an adjacent set.

INFEED MECHANISM

An infeed conveyor 28 extends substantially horizontally, transversely of and below the infeed ends of the racks. The infeed conveyor includes (referring to FIGS. 2, 3 and 4) an elongated angle member 32 anchored to the floor and extending transversely of the infeed ends of the racks. Secured to the upstanding flange 32a of angle member 32 is an elongated track 34 (best seen in FIGS. 2 and 4). The upper reach of an elongated, endless conveyor chain 36 is supported for substantially horizontal travel on top of track 34. The conveyor chain is driven under power by appropriate drive means, whereby the upper reach of the chain travels to the left in FIGS. 1 and 4 and away from the viewer in FIG. 2.

Secured to and projecting laterally outwardly from the side of track 34 are a plurality of parallel, elongated, laterally spaced, substantially horizontal rods 40. A roller 42 is journaled for rotation on the end of each rod opposite the end of the rod secured to the track. Rollers 42 and conveyor chain 36 are adapted to support the underside of a sheet pallet 22, as is illustrated in FIGS. 1 through 4. An elongated guide bar 44 secured to and extending parallel to the upstanding flange of angle member 32, projects upwardly from the top of the angle member to act as a guide for an edge of a pallet. The infeed conveyor is operable to convey successive block-laden pallets therealong to the left in FIGS. 1 and 3 and away from the viewer in FIG. 2.

Referring now to FIGS. 1 through 3, at 50 is indicated generally an elevator which is positioned adjacent, and is movable transversely of, the infeed ends of the racks. As will be explained in greater detail below, the elevator is shiftable transversely of the infeed ends of the racks, whereby it may be positioned adjacent the infeed ends of selected sets of racks in the kiln.

The elevator comprises an upright frame indicated generally at 52. The frame is supported on a pair of wheels 54 which run on a rail 56 extending parallel to and spaced outwardly from infeed conveyor 28. A reversible hydraulic motor 58, (see FIG. 3,) is drivingly connected to one of wheels 54. Controls for the elevator are housed in an enclosure 60 on frame 52. The upper portion of frame 52 is supported for movement along a horizontal H-beam rail 66 by rollers 68, 70. These rollers contact the inner and outer vertical surfaces of one flange of rail 66 (see FIG. 2).

Mounted on frame 52, adjacent one of its sides, are a pair of endless, elongated, parallel, and laterally spaced chains 80, 82 (see FIGS. 2 and 3). Lower portions of the chains are trained around a pair of spaced apart sprockets 84 mounted on a common rotatable shaft 86 adjacent the bottom of the frame. Upper portions of the chains are trained over a pair of spaced sprockets 88 mounted on a common rotatable shaft 90 adjacent the top of frame 52. Sprockets 84, 86 are so positioned that chains 80, 82 have substantially parallel, vertical reaches 80a, 82a, respectively, facing inwardly toward the center of the frame. The undersides of sprockets 84 are below rollers 42 on the infeed conveyor (see FIGS. 2 and 3), and the tops of sprockets 88 are spaced above the uppermost angle members 14 in the kiln. A similar set of chains 94, 96 (see FIG. 3) are mounted in a similar manner adjacent the opposite side of frame 52. The inwardly facing reaches 94a, 96a of these chains are spaced laterally from and extend parallel to reaches 80a, 82a of chains 80, 82.

A plurality of substantially horizontal, elongated lifting arms 100, 102 are mounted on chains 80, 82, and on chains 94, 96, respectively, for movement therewith. Each of arms 100 is secured at one of its ends to chain 82 in a region spaced outwardly from conveyor 28, and a midportions of each arm 100 is secured to chain 80 adjacent the infeed conveyor (see FIG. 2). A portion of each arm 100 thus extends outwardly from chain 80 toward the infeed ends of the racks, parallel to the racks, and into and over the region of infeed conveyor 28. Arms 102 are similarly mounted on chains 94, 96.

The arms are spaced apart vertically on the chains a distance slightly greater than the height of the articles they are to lift. In this particular embodiment they are spaced a distance slightly greater than the combined height of a layer of concrete blocks and the thickness of a pallet on which the blocks ride (see FIGS. 2 and 3).

A hydraulic motor 104 (see FIGS. 2 and 3) is mounted adjacent the top of frame 52. Motor 104 is operatively connected, through a drive chain 106 and a pair of gear boxes 108, 110 to the upper shafts mounting chains 80, 82 and chains 94, 96. The connection between the motor and shafts is such that operation of the motor produces synchronized upward movement of the inwardly facing reaches 80a, 82a, 94a, 96a of the drive chains. Arms 100, 102 thus may be maintained substantially horizontal while being raised with the inwardly facing reaches of the chains. Further, facing pairs of arms on the inwardly facing reaches of the chains are maintained with their upper surfaces within substantially common horizontal planes.

As is best seen in FIGS. 3 and 4, the spacing of rollers 42 on infeed conveyor 28 is such that arms 100, 102 on the outwardly facing reaches of chains 80, 82, and 94, 96 (the two outermost arms in FIG. 4) may move downwardly between spaced pairs of rollers, and arms 100, 102 on the inwardly facing reaches of the chains (the two innermost arms in FIG. 4) may move upwardly other other pairs of rollers. Arms 100, 102 on the inwardly facing reaches of the chains are positioned to engage the underside of a pallet 22 (shown in dot-dashed outline in FIG. 4) supported and properly positioned on infeed conveyor 28, and on operation of motor 104, to lift such pallet directly vertically therefrom. A pneumatic, shock absorbing stop 112 which is mounted on frame 52 is operable to stop pallets moved to the elevator by conveyor 28 in proper position to be lifted by arms 100, 102.

Referring to FIGS. 2 and 3, a pair of vertical, laterally spaced guide bars 114, 116 are secured to frame 52 in regions above conveyor 28 and between arms 100, 102 on the inner and outer reaches of each chain. These guide bars serve to maintain proper lateral positioning of a pallet as it is raised on arms 100, 102.

Elevator 50 also includes a pair of elongated, vertical, laterally spaced columns 124, 126 supported on frame 52. These columns are positioned inwardly on the frame from the inner reaches of chains 80, 82, 94, 96, and extend between the top and bottom of frame 52.

Shifter mechanism, indicated generally at 130 in FIGS. 1 2 and 3, is mounted for vertical movement on columns 124, 126. The shifter mechanism includes a carriage 134 supported for vertical movement on columns 124, 126 by a plurality of rollers 140 which engage the edges of the columns facing the racks, and rollers 142 engaging the opposite edges of the columns. Other rollers 144 on carriage 134 (see FIG. 3) engage the inwardly facing surfaces of columns 124, 126 to inhibit lateral movement of the carriage.

Mounted on carriage 134 is a hydraulic ram 148 having an extensible-contractible rod 148a. The rod is shiftable under power along a substantially horizontal path parallel to arms 100, 102, and parallel to the racks. Mounted on the outer extremity of rod 148a is a pusher block 150. The shifter mechanism is operable, on extension of ram 148, to push a block-laden pallet from a pair of arms 100, 102 and onto a rack adjacent the ram.

An elongated chain 156 (see FIG. 3), trained over sprockets adjacent the top and bottom of frame 52 has its opposite ends connected to the top and bottom of carriage 134, respectively. Sprocket 158 over which chain 156 is trained at the top of the frame is driven by a reversible hydraulic motor 160. Motor 160 may be operated in either of reverse directions, whereby chain 156 raises or lowers carriage 134 as required to place the shifter mechanism adjacent and substantially in axial alignment with the infeed end of a rack in the kiln.

Explaining the operation of the apparatus thus far described, the elevator first is moved into alignment with the infeed ends of a selected set of racks in the kiln by selective operation of motor 58. The shifter mechanism is placed substantially in axial alignment with a selected rack in the set by operation of motor 160. Block-laden pallets are moved in succession to the elevator by infeed conveyor 28 with the pallets spaced apart on the conveyor. As each successive pallet is properly positioned on the conveyor for lifting by the elevator, arms 100, 102 are operated by motor 104 to lift the pallet from the conveyor. The pallet is raised to a position substantially in axial alignment with the rack with which the shifter is aligned.

Ram 148 then is extended. Extension of ram 148 pushes the pallet and blocks aligned therewith to the left in FIG. 2 and onto the selected rack. In the process, pallets and blocks previously deposited on that rack will be shoved to the left in FIG. 2. If the rack previously has been fully loaded with block-laden pallets, a pallet and its associated blocks will be pushed from the discharge, or outfeed, end of the rack as a pallet is moved onto its infeed end.

After the shifter has moved a desired number of pallets onto a rack, motor 160 may be operated to raise, or lower, the shifter to a position adjacent another rack in that set. After all racks in a set have been filled the elevator and shifter may be moved transversely of the racks to a position adjacent the infeed ends of the racks in another set by operation of motor 58.

Locking means, indicated generally at 164 in FIGS. 2 and 3, is provided to assure that the elevator is maintained properly positioned adjacent the infeed ends of a set of racks while the shifter mechanism operates. The locking mechanism includes an elongated track 166 extending parallel to rail 56 and an extensible-contractible hydraulic ram 168 mounted vertically on frame 52 above the track. Track 166 has spaced indentations, such as those indicated at 166a, 166b, formed in its upper surface. The positioning of each indentation in the track is such that when ram 168 is positioned thereover and its rod is extended into such indentation (as illustrated in FIG. 3) the elevator is properly aligned with the infeed end of a set of racks. This also locks the elevator against lateral movement along rail 56. Retraction of the ram raises its rod above track 166 to permit movement of the elevator along the rail.

OUTFEED MECHANISM

Referring again to FIGS. 1 and 2, adjacent the downstream, or outfeed, ends of the racks is an outfeed conveyor, indicated generally at 170. The outfeed conveyor is similar to conveyor 28 previously described, having a power-driven, track-supported drive chain, and a plurality of laterally spaced roller and rod combinations projecting to one side of the chain and its associated track. The chain and rollers in conveyor 170 are operable to support the underside of a block-laden pallet and convey it away from the racks, to the right in FIG. 1 and toward the viewer in FIG. 2.

Positioned over outfeed conveyor 170 adjacent the outfeed ends of the racks is transfer mechanism, indicated generally at 174. The transfer mechanism, as will be described in greater detail below, is operable to receive pallets discharged from the racks and to lower them onto outfeed conveyor 170.

Transfer mechanism 174 includes a substantially upright frame 176 supported on a pair of wheels 178 which run on a rail 180 paralleling outfeed conveyor 170. One of wheels 178 is driven by a motor 184 for moving the transfer mechanism along rail 180 transversely of the outfeed ends of the racks. The upper end of frame 176 is supported for movement along a horizontal H-beam rail 186 by a plurality of rollers 188, 190 which bear against the inner and outer surfaces of a flange of rail 186.

The transfer mechanism also includes a pair of endless, elongated, parallel, laterally spaced chains, such as those indicated generally at 196, 198, mounted adjacent each side of frame 176. Chains 196, 198 are trained over sprockets mounted on rotatable shafts at the top and bottom of frame 176 in a manner similar to the mounting for chains 80, 82 and 94, 96 on the elevator at the infeed ends of the racks.

A plurality of substantially horizontal, elongated, arms 200 are mounted on chains 196, 198 in a manner similar to the mountings for arms 100, 102 on the infeed elevator. A hydraulic motor 206 mounted adjacent the top of frame 176 is connected to the shafts mounting the upper portions of chains 196, 198. Motor 206 is operable to rotate these shafts in such a manner that the inwardly facing reaches of the chains travel downwardly and their outwardly facing reaches move upwardly.

The positioning of the rollers on outfeed conveyor 170 and arms 200 on the transfer mechanism is such that the arms on the inwardly facing reaches of chains 196, 198 may move downwardly between spaced pairs of rollers on the outfeed conveyor and arms on the outwardly facing reaches of such chains may move upwardly between other pairs of rollers.

Indicated generally at 210 in FIG. 2 is a receiver for receiving pallets discharged from the outfeed ends of the racks. The receiver includes a carriage 212 supported for vertical movement on a pair of vertical columns, such as that indicated generally at 214, on frame 176. Mounted on carriage 212 for generally horizontal movement toward and away from the infeed ends of the racks are a pair of elongated, laterally spaced receiver arms, such as that indicated generally at 220 (see FIGS. 1 and 2). Each receiver arm has a substantially horizontal upper surface 220a adjacent its forward end (at the right in FIG. 2). The receiver arms are secured to each other by elongated bars 221 extending therebetween at their front and rear ends. The arms are substantially aligned with each other in a direction extending transversely of the ends of the racks, whereby their horizontal surfaces 220a lie in a common horizontal plane.

The arms are mounted for sliding movement along an inclined path between a retracted position, as shown in solid outline in FIG. 2, and an extended, or receiving, position, shown in dot-dashed outline. When arms 220 are retracted their forward ends are spaced outwardly from the racks and adjacent chain 196, and when they are extended their forward ends are closely adjacent the outfeed ends of the racks. As is seen in FIG. 2 the carriage may be positioned so that the horizontal surfaces 220a of the receiver arms are at substantially the elevation of a rack when in their extended, receiving, positions. When the receiver arms are fully retracted, as shown in solid outline in FIG. 2, the horizontal support surfaces 220a are substantially lower.

A hydraulic ram 222, positioned between arms 220, is secured at its cylinder end to carriage 212 and at its rod end to arms 220. Extension of the ram extends the arms and retraction of the ram retracts the arms.

A pair of arms, such as that indicated at 200A in FIG. 2, positioned in the transfer mechanism intermediate the extended and retracted elevations for surfaces 220a of the receiver arms, are in a position to receive a pallet discharged from the outfeed ends of the racks. Explaining further, when a block-laden pallet is shoved off the end of the rack with the receiver arms extended, the pallet will move fully onto the receiver arms. The receiver arms are then retracted, moving downwardly as they retract. As they retract they deposit the pallet on arms 200A.

Mounted on top of frame 176 is a reversible hydraulic motor 230 connected through a sprocket 232 and a chain 234 to carriage 212. Actuation of motor 230 is operable to raise and lower carriage 212, as required, to place receiver 210 adjacent the outfeed end of a selected rack, whereby arms 220 will be in proper position to receive pallets discharged from the outfeed end of the rack.

Briefly explaining the operation of the transfer mechanism, motor 184 is operated selectively to position the mechanism adjacent the outfeed end of the set of racks with which the infeed elevator is aligned and motor 230 is operated to position the receiver adjacent the outfeed end of the rack in said set with which the shifter carriage is aligned. A pair of arms 200 are positioned slightly below the elevation of said rack and the receiver arms are extended to catch a pallet discharged from the outfeed end of the rack. When a pallet is discharged onto the receiver arms they are retracted, lowering the pallet onto arms 200. Arms 200 then are lowered to place the pallet on the outfeed conveyor which carries it away from the kiln. The receiver arms then are extended to receive another pallet.

After a desired number of new pallets have been loaded onto the rack by the shifter it is raised, or lowered, to fill another rack in the same set. The receiver may be raised or lowered by actuation of motor 230 concurrently with movement of the shifter to place the receiver adjacent said other rack also. Further, after the desired racks in a set have been filled the transfer mechanism may be moved by motor 184 transversely of the racks to a position adjacent the outfeed set of ends of another set of racks in the kiln.

CONTROLS

Also included in the invention are controls for producing automatic operation of the apparatus previously described.

Referring first to FIG. 2, at 250 is indicated a light source mounted on, and movable vertically with, carriage 212. The light source is operable to direct a beam of light over the tops of blocks on a rack and toward the infeed ends of the racks. A photocell 252 mounted on, and shiftable vertically with, carriage 134 on the infeed elevator is operable to sense the light beamed in its direction from source 250. As will be described in greater detail below, such light source and photocell act as an interlock to prevent actuation of ram 148 at the infeed end of a rack if receiver 210 is not properly positioned at the outfeed end of the same rack.

Figure 7:
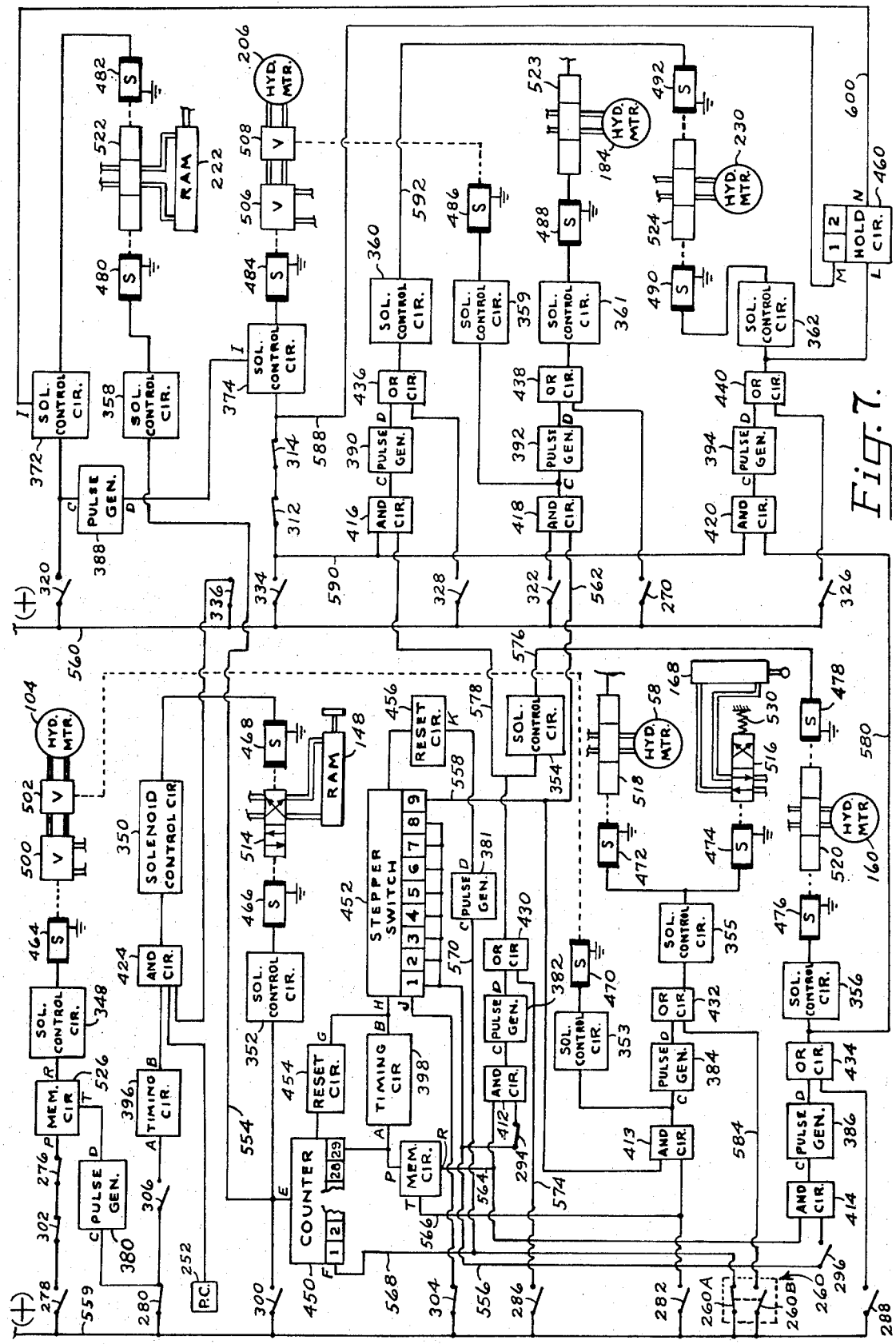
FIG. 7 is a schematic illustration of control means for the apparatus.

Referring now to FIGS. 2, 3 and 7, the control means for the apparatus also includes a plurality of limit switches carried on frames 52 and 176 for sensing the positions of pallets and operating mechanism during operation of the apparatus. Mounted on the lower portion of frame 52 is a feeler switch device 260. Switch device 260 has an arm which rides up and onto a cam projection 262 secured to rail 56 when the elevator frame is in the position shown in FIG. 3 aligned with a set of racks. Similar cam projections are secured to rail 56 adjacent each of the sets of racks in the kiln. Such a cam adjacent the next set of racks is illustrated at 264. The cam projections are so positioned along the rail that the arm of switch 260 rides up and onto one of them when the frame is adjacent and properly aligned with a set of racks.

Switch device 260 includes a pair of switches 260A, 260B, shown schematically in FIG. 7. When the elevator is aligned with a set of racks and the arm of device 260 is on a cam projection, switch 260A is closed and 260B is open. When the elevator is not in alignment with a rack, i.e., while it is being moved from one set of racks to another, the arm of device 260 is not supported by a cam projection and switch 260A is open and 260B is closed. A feeler switch 270 is mounted on frame 176 at the outfeed ends of the racks. Cam projections such as that noted at 272 in FIG. 2, similar to those just described at 262, 264, are so positioned along rail 180 that the feeler arm of switch 270 rides up and onto one of them to open switch 270 when the transfer mechanism is properly aligned adjacent the outfeed ends of a set of racks. At positions intermediate the projections switch 270 is closed.

Referring to FIG. 3, at 276 is a normally-closed switch carried on frame 52. This switch is opened by a pallet on the infeed conveyor adjacent the elevator in a position where it may interfere with vertical movement of arms 100 of the elevator. At 278 is a normally-open switch carried on frame 52 which is closed by a pallet on the infeed conveyor in proper position to be raised by the arms of the elevator, as illustrated in FIGS. 3 and 4.

At 280, in FIGS. 2 and 3, is a normally-open switch which is closed by an arm 100 when the arms on the inwardly facing reaches of the chains are positioned at substantially the same elevations as the racks. At 282 is a normally-open switch which is closed by an arm 100 when these arms are in positions midway between the racks. With the arms in such midway, or half angle, positions, the arms nearest the bottom of the frame will be positioned with one arm directly beneath lower sprockets 84 and thus below the level of rollers 42 on the infeed conveyor, and the next lowest arms will be spaced above the rollers. With the arms in their half angle positions they may be moved transversely of the racks with frame 52 without hitting rollers 42.

At 286, 288 on top of frame 52 are a pair of normally-open switches. These switches have feeler arms which engage a cam 290. The cam is rotated by motor 160 which raises and lowers the shifter carriage. The cam is so formed that when the shifter is properly positioned at the elevation of a rack, switches 286, 288 are opened, and the switches are closed with the shifter at any other position. Two feelers switches (286, 288) are provided, since the cam will produce slight variations in actuation of the feeler switches dependent upon whether the shifter is being raised or lowered. Each of switches 286, 288 is closed on the shifter moving up or down from one rack to the next, however, as will be described in detail below, one of the switches is operable to control raising of the carriage and the other switch is operable to control lowering of the carriage.

A pair of switches 294, 296 on carriage 134 are positioned to engage trip elements (not shown) when the carriage reaches its highest and lowest positions on the frame. The trip elements are operable, when the carriage is in its lowest position, to close switch 294 and open 296. These switches maintain their positions until the carriage is raised to its highest position at which time switch 296 is closed and 294 is opened. These conditions are maintained until the carriage again is fully lowered.

Also mounted on carriage 134, are normally-open switches 300, 302, 304. Switch 300 is closed when ram 148 is extended and switches 302, 304 are closed when the ram is retracted. Also mounted on the carriage is a normally-open switch 206 (see FIGS. 2 and 3). This switch is closed by a pallet raised to a position adjacent the shifter mechanism and substantially in axial alignment with a rack.

Referring still to FIG. 2, a pair of switches 312, 314 are mounted on frame 176 adjacent the outfeed conveyor. Switch 312 is positioned between the sets of chains at opposite sides of the transfer mechanism. It is a normally-closed switch and is held open when a pallet is on the outfeed conveyor under arms 200. Switch 214 is disposed toward the viewer from chains 196, 198. Switch 314 also is a normally-closed switch. It is opened by a pallet as such is moved away from the transfer mechanism on conveyor 170 and is held open until such pallet clears the transfer mechanism. Switches 312, 314 are spaced apart a distance which is less than the length of a pallet. A pallet lowered onto the outfeed conveyor initially will open switch 312, and, on being moved out of the transfer mechanism by the conveyor, will open switch 314 before 312 is closed. It is important that at least one of these switches be held open until the pallet is clear of the arms 200, thus the spacing between them which allows the pallet to open 314 before moving off 312 to let it close.

At 320 is illustrated a normally-open switch which is closed by one of arms 200 when these arms are at proper elevations to receive pallets discharged from the outfeed ends of the racks. At 322 is a normally-open switch which is closed by one of arms 200 when they are midway between their positions for receiving pallets from the racks. When the arms are in such positions the lowest arm on a chain is below the rollers on the outfeed conveyor and the next lowest arms are above the rollers.

Mounted atop frame 176, adjacent motor 230, are a pair of normally-open switches 326, 328 which have feeler arms riding on a cam 330 rotated by motor 230. Cam 330, like cam 290 previously described, is so formed that when the receiver carriage is properly positioned to receive pallets from a rack, switches 326, 328 are open, and the switches are closed with the receiver at any other elevation.

At 334 and 336 are indicated a pair of spaced, normally-open switches mounted on carriage 212. Switch 334 is closed by the receiver arms in their retracted positions and switch 336 is closed by the receiver arms in their extended positions.

All of the switches and motors previously described are illustrated schematically in FIG. 7.

Referring to FIG. 7, the control circuit, in addition to the switches just described, includes:

12 solenoid control circuits ( 348, 350, 352, 353, 354, 355, 356, 358, 359, 360, 361, 362);

two solenoid control circuits with inhibit function (372, 374);

nine pulse generators (380, 381, 382, 384, 386, 388, 390, 392, 394);

two timing circuits (396, 398), six two-input AND circuits (412, 413, 414, 416, 418, 420);

one three-input AND circuit (424), six two-input OR circuits (430, 432, 434, 436, 438, 440);

one counter (450);

one stepper switch (452);

two reset circuits (454, 456);

one hold two-count circuit (460);

15 solenoids (464, 466, 468, 470, 472, 474, 476, 478, 480, 482, 484, 486, 488, 490, 492);

four off-on hydraulic valves (500, 502, 506, 508);

two two-position spool valves (514, 516);

five three-position spool valves (518, 520, 522, 523, 524); and two memory circuits with inhibit function (526, 528).

Referring now to hydraulic motor 104 in FIG. 7, this motor is connected to and controlled by valves 500, 502. With both valves in their open positions, fluid under pressure is supplied to the motor from a suitable source of pressure fluid causing it to operate to raise arms 100, 102 on the elevator. Valve 500 is normally-closed and is ganged to solenoid 464. Energizing of the solenoid opens the valve. Valve 502, conversely, is normally-open and is ganged to solenoid 470, the energizing of which closes the valve.

Ram 148 is connected to and controlled by two-position valve 514. With the valve in one position fluid under pressure is supplied from a suitable source to the ram causing it to extend, and with the valve shifted to its other position, the ram is caused to retract. Valve 514 is ganged to solenoids 466, 468. Energizing of solenoid 466 shifts valve 514 to retract the ram and energizing of solenoid 468 shifts valve 514 to extend the ram.

The motor 58 is connected to and controlled by three-position valve 518. With the valve in its normally-centered position, as illustrated in FIG. 7, no fluid is supplied to the motor and such is stopped. Valve 518 is ganged to solenoid 472 on its left side. Energizing of solenoid 472 shifts the valve, whereby fluid under pressure is supplied to the motor to cause it to move the elevator and shifter in one direction transversely of the infeed ends of the racks. In the embodiment illustrated energizing of the solenoid operates the motor to shift the elevator along rail 56 to the left in FIGS. 1 and 3 and away from the viewer in FIG. 2. It should be understood that shifting of the valve in the opposite direction would operate motor 58 to move the elevator in the opposite direction. Circuitry for producing shifting of the valve in such opposite direction has been omitted for simplicity.

Ram 168 is connected to and controlled by two-position valve 516. Valve 516 is biased by a spring 530 to the right in FIG. 7 to a position in which fluid under pressure is supplied from a suitable source to the ram to extend it. Valve 516 also is ganged to solenoid 474, the energizing of which shifts valve 516 to the left to a position in which the ram is retracted.

Hydraulic motor 160 is connected to and controlled by three-position valve 520. With valve 520 in its normally-centered position, as shown, fluid under pressure is not supplied to the motor and such is stopped. Valve 520 is ganged to solenoid 476 on its left side and solenoid 478 on its right side. Energizing of solenoid 476 shifts valve 520, whereby fluid under pressure is supplied from a suitable source to the motor to operate it in one direction to lower the shifter carriage, and energizing of solenoid 478 shifts the valve to operate the motor to raise the shifter carriage.

Hydraulic ram 222 at the outfeed end of the apparatus is connected to and controlled by three-position valve 522. With valve in its normally-centered position as shown in FIG. 7, no fluid under pressure is supplied to the ram and such is locked in position. The valve is ganged to solenoid 480 on its left and solenoid 482 on its right. Energizing of solenoid 480 shifts valve 522 to supply fluid under pressure from a suitable source to the ram to retract it, and energizing of solenoid 482 shifts the valve to extend the ram.

Referring now to hydraulic motor 206, such is connected through valves 506, 508 to a source of fluid under pressure. Valve 506 is normally closed, and valve 508 is normally open. Valve 506 is ganged to solenoid 484, whereby energizing of the solenoid opens valve 506. Valve 508 is ganged to solenoid 486, whereby energizing of the solenoid closes valve 508. Operation of motor 206 lowers the arms on the inwardly facing reaches of the chains in the transfer mechanism.

Hydraulic motor 184 is connected to and controlled by three-position valve 523. With the valve in its normally-centered position, as illustrated in FIG. 7, no fluid is supplied to the motor and such is stopped. Valve 523 is ganged to solenoid 488 on its left side. Energizing of solenoid 488 shifts the valve, whereby fluid under pressure is supplied from a suitable source to the motor to cause it to move the transfer mechanism transversely of the outfeed ends of the racks, to the left in FIG. 1, and away from the viewer in FIG. 2. Shifting of the valve in the opposite direction would operate motor 184 to move the transfer mechanism in the opposite direction. Circuitry for producing shifting of valve 523 in the opposite direction has been omitted for simplicity.

Referring now to hydraulic motor 230, such is connected to and controlled by three-position valve 524. With the valve in its normally-centered position, shown in FIG. 7, no fluid is supplied to the motor and such is stopped. The valve is ganged to solenoid 490 on its left side and to solenoid 492 on its right side. Energizing of solenoid 490 shifts the valve to the left to supply fluid under pressure from a suitable source to the motor to lower the receiver carriage. Energizing of solenoid 492 shifts the valve to the right to raise the receiver carriage.

All of the hydraulic rams and motors illustrated are connected to their respective sources of pressure fluid through either conventional rotary or linear cam-operated flow control valves. These valves and their operating cams have been omitted from the drawings for simplification, however it should be understood that each such cam-operated valve is operable to produce relatively slow starting and stopping for its associated ram or motor, while permitting substantially unretarded operation at other times.

Explaining briefly certain terminology which will be used in describing the control circuit, various components in the circuit operate in response to a pair of voltage levels. More specifically, one of these levels corresponds to ground and will be called hereinafter a "0" state. The other level corresponds to a certain positive voltage which will be referred to hereinafter as a "1" state. A terminal, or conductor, having one of these voltage levels on it will be referred to as being in, or having on it, either a "0" or "1" state. The "1" state may be considered to be a signal, or operative, state while the "0" state may be considered to be a no signal, or nonoperative, state.

Considering now the operation of the AND circuits, with one or more of the input terminals in a circuit in a "0" state the output of the circuit is in a "0" state also. When all of the input terminals are in a "1" state the output terminal is in a "1 " state. The "1" state so produced will be continuous until such time as one, or more, of the input terminals returns to a "0" state.

Referring to the OR circuits, each will have a "1" state at its output terminal with a "1" state at either of its input terminals. The "1" state so produced at the output will be continuous until all of its input terminals are placed in a "0" state. With all input terminals at a "0" state its output is at a "0" state.

Considering the timing circuits, each has an input terminal A and an output terminal B. The output terminal of each generally is in a "0" state. The operation of a timing circuit is such that when a "1" state is supplied to its input A, its output terminal B switches to a "1" state after a preselected time interval. The "1" state so produced at output B will be continuous until the input terminal returns to a "0" state.

Each of the pulse generators has an input terminal C and an output terminal D. The output D is normally in a "0" state. When a "1" state is presented at input terminal C a pulse at the "1" state is produced at the output D. Pulse generators 382, 384, 386, 390, 392, and 394 each produces a pulse which is of such duration as to initiate movement of certain apparatus which will be sufficient to close other switches, as will be described in greater detail below.

Each solenoid control circuit (348, 350, 352, 353, 354, 355, 356, 358, 359, 360, 361, 362) is so constructed that when a "1" state is supplied to its input terminal it energizes its associated solenoid.

Each solenoid control circuit with inhibit function (372, 374) operates in a similar fashion, except that with a "1" state present at its inhibit input terminal (the terminal designated I) such solenoid control circuit ceases to energize its associated solenoid and is prevented from doing so until the "1" state is removed from its inhibit input terminal.

Counter 450 has a pair of input terminals E, F. The counter advances one count each time a "1" state is presented at its input terminal E. The counter illustrated in FIG. 7 is programmed for a count from one to 29, thus to be used with a kiln having racks, each of which is adapted to hold 29 edge-to-edge abutted pallets. This number, however, is variable dependent upon the length of the racks in a kiln and the number of pallets such racks will hold. The output of the counter is illustrated at its 29th count. The output terminal of the counter generally is in a "0" state. The counter is such that when a full count of 29 has been reached, if a "1" state exists at its input F, a "1" state is presented at its output, otherwise the "0" state remains at its output.

Reset circuit 454 has an input terminal G and is connected at its output terminal to counter 450. When a "1" state is presented at input G it is operable to reset counter 450 to its initial one count.

Stepper switch 452 has a pair of input terminals H, J and is constructed to advance one step each time a "1" state is presented at its input terminal H. The stepper illustrated in FIG. 7 includes nine steps for use with the eight-rack high kiln shown. This number is variable, dependent upon the number of racks in each set of racks in the kiln. Outputs one through eight, corresponding to steps one through eight, respectively, in the stepper are connected to a common conductor 566. Output nine, corresponding to step nine, is connected to a conductor 558. Each output generally is in a "0" state, until such time as the stepper advances to its corresponding step. When the stepper is advanced to a step, such step produces a "1" state on its associated conductor if, and only so long as, a "1" state is presented at input J of the stepper.

Reset circuit 456 has an input terminal K and is connected at its output terminal to the stepper switch. When a "1" state is presented at its input terminal K it is operable to reset the stepper switch to its initial count.

Explaining briefly how photocell 252 performs, the photocell has an output terminal on which it is capable of producing a signal (i.e., a "1" state). With light shining on the photocell from source 250, it places a "1" state at its output terminal. With light blocked from shining on the photocell its output terminal switches to a "0" state.

Referring now to hold circuit 460, such has a pair of input terminals L, M and an output terminal N. Its output terminal generally is in a "0" state. A "1" state on input terminal L produces a continuous "1" state at its output terminal N until two independent "1" state signals have been received at input terminal M. When two "1" state signals have been received at terminal M, output terminal N returns to a "0" state.

Memory circuits 526, 528 each have an input terminal P, an output terminal R, and an inhibit input terminal T. Output R of the circuit normally is in a "0" state. The operation of the circuit is such that when a "1" state is presented at its input P its output switches to a "1" state, if a "0" state exists at inhibit input T. Once output R has been switched to a "1" state it will remain in the "1" state, regardless of whether input P remains in a "1" state or returns to a "0" state, until a "1" state is presented at inhibit input T. A "1" state at input T will switch output R to a "0" state, regardless of the state of input P.

Further describing what is shown in FIG. 7, the left side of each of switches 278, 280, 300, 304, 286, 282, 260A, 260B, 288, 320, 336, 334, 328, 322, 270 and 326 are connected, through conductor 559, 560, to a suitable source of positive voltage. The right side of switch 278 is connected through switches 302, 276, in series to input terminal P of memory circuit 526. Output terminal R of circuit 526 is connected to the input of solenoid control circuit 348.

The right side of switch 280 is connected to input terminal C of pulse generator 380, the output terminal D of which is connected to inhibit terminal T of memory circuit 526. The right side of switch 280 also is connected through switch 306 to the input terminal A of timing circuit 396. Output terminal B of circuit 396 is connected to the upper input terminal of AND circuit 424. The output terminal of photocell 252 is connected to the middle input terminal of circuit 424. The lower input terminal of circuit 424 is connected to the right side of switch 336. The output terminal of AND circuit 424 is connected to the input terminal of solenoid control circuit 350, the output terminal of which is connected to solenoid 468.

The right side of switch 300 is connected to input terminal E of counter 450, the input terminal of solenoid control circuit 352, and through a conductor 554 to the input terminal of solenoid control circuit 358. The output terminal of solenoid control circuit 352 is connected to solenoid 466, while the output terminal of solenoid control circuit 358 is connected to solenoid 480. The output at the 29th count of counter 450 is connected to input terminal A of timing circuit 398. The output terminal B of timing circuit 398 is connected to input terminal G of reset circuit 454 and input terminal H of stepper switch 452. Output terminals one through eight of stepper switch 452 are connected through conductor 556, to the left sides of switches 294, 296. The right sides of switches 294, 296 are connected to the lower input terminals of AND circuits 412, 414, respectively. Output terminal nine of the stepper switch is connected, through conductor 558, to the upper input terminal of AND circuit 413. A conductor 562 connects conductor 558, and thus output nine of the stepper, to the lower input terminal of AND circuit 418.

The output at the 29th count of counter 450 also is connected to input terminal P of memory circuit 528. Output R of circuit 528 is connected through a conductor 564 to the upper input terminals of AND circuits 412, 414. Inhibit input T of circuit 528 is connected through a conductor 566 to the right side of switch 282.

Input F of counter 450 is connected through a conductor 568 to the right side of switch 260A. Another conductor 570, joined to conductor 568, also connects the right side of switch 260A to input C of pulse generator 381. Output terminal D of generator 381 is connected to input terminal K of reset circuit 456.

The right side of switch 304 is connected to input terminal J of stepper 452.

Referring now to AND circuit 412 its output terminal is connected to input terminal C of pulse generator 382. The output terminal D of generator 382 is connected to the upper input terminal of OR circuit 430. The lower input terminal of circuit 430 is connected, through a conductor 574, to the right side of switch 286. The output terminal of circuit 430 is connected to the input of solenoid control circuit 354. The output terminal of circuit 354 is connected through a conductor 576 to solenoid 478. The output terminal of OR circuit 430 also is connected through a conductor 578 to the lower input terminal of AND circuit 416.

Referring now to AND circuit 414, its output terminal is connected to input terminal C of pulse generator 386, the output terminal D of which is connected to the upper input terminal of OR circuit 434. The lower input terminal of circuit 434 is connected to the right side of switch 288. The output terminal of circuit 434 is connected to the input terminal of solenoid control circuit 356, the output terminal of which is connected to solenoid 476. The output terminal of OR circuit 434 also is connected, through a conductor 580, to the lower input terminal of AND circuit 420.

The right side of switch 282 is connected to the lower input terminal of AND circuit 413. The output terminal of circuit 413 is connected to the input terminal C of pulse generator 384 and to the input terminal of solenoid control circuit 353. The output of circuit 353 is connected to solenoid 470. The output terminal D of generator 384 is connected to the upper input terminal of OR circuit 432. The lower input terminal of circuit 432 is connected, through a conductor 584, to the right side of switch 260B. The output terminal of OR circuit 432 is connected to the input terminal of solenoid control circuit 355, the output of which is connected to solenoids 472, 474.

The right side of switch 320 is connected to the input terminal of solenoid control circuit 372, and also to input terminal C of pulse generator 388. The output terminal D of generator 388 is connected to inhibit input terminal I of solenoid control circuit 374. The output terminal of solenoid control circuit 372 is connected to solenoid 482.

The right side of switch 334 is connected, through switches 312, 314, in series, to the input terminal of solenoid control circuit 374, and through a conductor 588 to input terminal M of hold circuit 460. The output terminal of circuit 374 is connected to solenoid 484.

The right side of switch 334 also is connected, through a conductor 590, to the upper input terminals of AND circuits 416, 420. The output terminal of AND circuit 416 is connected to input terminal C of pulse generator 390, the output terminal D of which is connected to the upper input terminal of OR circuit 436. The lower input terminal of circuit 436 is connected to the right side of switch 328. The output terminal of circuit 436 is connected to the input terminal of solenoid control circuit 360, the output terminal of which is connected, through a conductor 592, to solenoid 492.

The output terminal of AND circuit 420 is connected to input terminal C of pulse generator 394, the output terminal D of which is connected to the upper input terminal of OR circuit 440. The lower input terminal of circuit 440 is connected to the right side of switch 326. The output terminal of OR circuit 440 is connected to input terminal L of hold circuit 460 and to the input terminal of solenoid control circuit 362. The output terminal of circuit 362 is connected to solenoid 490. The output terminal N of hold circuit 460 is connected, through a conductor 600, to inhibit input terminal I of solenoid control circuit 372.

The right side of switch 322 is connected to the upper input terminal of AND circuit 418. The output of circuit 418 is connected to input terminal C of pulse generator 392 and to the input terminal of solenoid control circuit 359. The output terminal of circuit 359 is connected to solenoid 486. The output terminal D of generator 392 is connected to the upper input terminal of OR circuit 438, while the lower input terminal of circuit 438 is connected to the right side of switch 270. The output terminal of OR circuit 438 is connected to solenoid control circuit 361. The output of circuit 361 is connected to solenoid 488.

OPERATION

Explaining the operation of the control circuit described, with the switches in the positions shown in FIG. 7, the hydraulic motors are stopped, shifter ram 148 is retracted, and receiver ram 222 is extended. Ram 168 is extended into an indentation in its associated track, with frame 52 thus held in position aligned with a set of racks in the kiln.

Assuming for the moment that there is no pallet held by arms 100, 102 adjacent shifter mechanism 130 and that a pallet has been moved on the infeed conveyer to a position over the lowermost arms in the elevator, as shown in FIGS. 2 and 4, such pallet on the infeed conveyer will contact and close switch 278. Closing of switch 278 presents a "1" state at input P of memory circuit 526. Inhibit input T is in a "0" state and output R switches to a "1" state. This places the input of solenoid control circuit 348 in a "1" state to actuate motor 104 to raise the elevator arms. This will occur if ram 148 is retracted to close switch 302 and if there is no pallet on the infeed conveyor in a position to interfere with arms 100 and open switch 276.

Elevator arms 100, 102 are raised by motor 104 until switch 280 is closed by an arm in its proper position adjacent a rack at the next higher elevation. Closing of switch 280 presents a "1" state at input C of pulse generator 380 which, in turn, produces a "1" state pulse at the inhibit input terminal T of circuit 526. This switchs its output R to a "0" state, thus to deenergize solenoid 464 and stop motor 104.

Such raising of the pallet from the infeed conveyor provides an open space into which the next successive block-laden pallet on the infeed conveyor may move onto the elevator and be raised one level by the elevator. This is continued until a pallet is supported in a position substantially aligned with a selected rack and adjacent shifter mechanism 130. In FIG. 2 the shifter and such a pallet are illustrated aligned with the sixth rack in an eight rack high kiln.

A pallet in this position closes switch 306 placing input A of timing circuit 396 in a "1" state. After a specified time interval, giving the arms sufficient time to come to a complete stop, a "1" state is produced at output terminal B of timing circuit 396, and thus, also at the upper input of AND circuit 424. If the receiver carriage at the outfeed end of the racks is properly aligned with the same rack as shifter mechanism 130 a "1" state will be present at the output of photocell 252 and at the middle input of circuit 424. If receiver arms 220 at the outfeed end of the apparatus are extended switch 336 will be closed placing the lower input terminal of AND circuit 424 in a "1" state. With these conditions met, a "1" state exists at the output of circuit 424 and at the input of solenoid control circuit 350. This energizes solenoid 468 to extend shifter ram 148.

Extension of ram 148 shoves the pallet onto the adjacent rack and closes switch 300. Assuming that the rack previously has been filled, as shown in FIG. 2, the block-laden pallet will be shoved off the outfeed end and onto receiver arms 220. Closing of switch 300 produces a "1" state at input E of counter 450 to produce a count in the counter. Closing of switch 300 also energizes solenoid control circuit 352 to retract ram 148, and through conductor 554 presents a "1" state at the input of solenoid control circuit 358. The "1" state at the input of circuit 358 retracts receiver ram 222 and arms 220. Retraction of arms 220 deposits the discharged pallet onto a pair of arms 200 of the transfer mechanism.

With receiver arms 220 retracted, switch 334 is closed. If there are no pallets on outfeed conveyor 170 in a position to interfere with the lowering of arms 200 switches 312, 314 will be closed as shown. Closing of switch 334 then places the input of solenoid control circuit 374 in a "1" state to operate motor 206 and lower arms 200 one rack height. When the arms have been lowered one rack height switch 320 is closed. This places the input of pulse generator 388 in a "1" state and produces a "1" state pulse at its output which is transmitted to inhibit input I of solenoid control circuit 374. The "1" state at input I of circuit 374 deenergizes solenoid 484 and stops motor 206. Closing of switch 320 also places the input of solenoid control circuit 372 in a "1" state, whereby ram 222 is extended to extend receiver arms 222. The arms, thus extended, are again positioned to receive a pallet shoved from the outfeed end of the rack and switch 334 is opened.

The automatically controlled sequence of operation described thus far then is as follows, A pallet is moved by the infeed conveyor into a position where it may be picked up by a pair of arms 100, 102 on the elevator. The pallet is raised by the arms to a position adjacent the shifter mechanism and substantially in axial alignment with the infeed end of a rack. The pallet then is shoved off the arms by the shifter mechanism and onto the rack. A pallet shoved off the outfeed end of the rack is caught by receiver arms 220, which then are retracted to deposit the pallet on a pair of arms 200. The transfer mechanism lowers such pallet onto the outfeed conveyor, which moves it away from the racks. Each time ram 148 is extended to shift a pallet onto a rack the closing of switch 300 produces a count in counter 450.

This sequence of operation is repeated until such time as counter 450 has counted shifting of the requisite number of pallets onto the selected rack (in this embodiment 29 pallets). When this number of pallets has been shifted onto the selected rack, with switch 260A being closed, a "1" state is produced at the output of the counter, and thus at the input if timing circuit 398 and input P of memory circuit 528. Switch 282 is open, thereby placing inhibit input T of circuit 528 in a "0" state, and output R of circuit 528 switches to a "1" state. This "1" state is then transmitted to the upper input terminals of AND circuits 412, 414. After a predetermined time interval a "1" state is produced at output B of timing circuit 398, which places the input G of reset circuit 454 and the input H of stepper switch 452 in "1" states. The "1" state at input G of circuit 454 resets counter 450 to its initial number, and the "1" state at stepper 452 advances the stepper to its next higher number.

With the shifter mechanism at the level illustrated in FIGS. 2 and 3, on the completion of loading of the rack, stepper switch 452 would be advanced to its seventh step. With the shifter ram retracted switch 304 is closed to produce a "1" state at input J of stepper 452. Advancing stepper 452 to its seventh step places its number seven output in a "1" state, and thus presents a "1" state on conductor 556 and at the left sides of switches 294, 296. In FIG. 7 switch 294 is closed and switch 296 is open, to program the shifter mechanism for raising. The "1" state on conductor 556 is transmitted by closed switch 294 to the lower input of AND circuit 412.

The "1" states placed on the upper input of AND circuit 412 by memory circuit 528 and on its lower input terminal by switch 294 produces a "1" state at the output terminal of circuit 412 and at the input of pulse generator 382. The pulse generator then produces a long duration pulse at the "1" state which is transmitted to the upper terminal of OR circuit 430. A "1" state is produced at the output terminal of circuit 430 which, through solenoid control circuit 354, operates hydraulic motor 160 to initiate raising of the shifter carriage.

The "1" state existing at the output of circuit 430 also is transmitted through conductor 578 to the lower input terminal of AND circuit 416. The upper input terminal of AND circuit 416 is placed in a "1" state by the closing of switch 334 when receiver ram 222 is retracted. With both input terminals of AND circuit 416 in a "1" state a "1" state is produced at its output and at input C of pulse generator 390. The pulse generator, in turn, produces a long duration "1" state pulse at its output D which presents a "1" state at the upper input terminal of OR circuit 436. This produces a "1" state at the output of circuit 436 and at the input of solenoid control circuit 360, which initiates operation of motor 230 to raise the receiver carriage.

The pulses produced by pulse generators 382, 390 are of sufficient duration to operate motors 160, 230 until switches 286, 328 are closed by their associated cams. These switches, when closed, continue to produce "1" states at the inputs of their respective OR circuits. These switches remain closed and the carriages continue raising until the carriages are in positions aligned with the next higher rack. When the carriages are at their proper elevations switches 286, 328 open, stopping their respective motors. With the shifter and receiver thus raised, they are substantially in axial alignment with the next higher rack in the set of racks. With the shifter and receiver carriages properly positioned at opposite ends of the same rack photocell 252 detects light from source 250.

After the shifter and receiver are moved to the next higher rack (the seventh rack in the set), the above-described sequence of operation is repeated to fill this rack with new block-laden pallets. When this rack is filled, as determined by the counts of counter 450, stepper switch 452 is advanced to its eighth step and the control circuit raises the shifter and receiver carriages to the top rack in the set (the eighth rack). At this time switches 294, 296 are operated, whereby switch 294 is opened and switch 296 is closed.

Once the shifter and receiver carriages have completed filling the uppermost, or eighth, rack, stepper switch 452 produces a "1" state at its ninth output terminal which is transmitted, through conductor 558, to the upper input terminal of AND circuit 413 and, through conductor 562 to the lower input terminal of AND circuit 418. A pallet received on the infeed conveyor in a position to be lifted by arms 100, 102, closes switch 278, actuating motor 104 to lift such pallet from the infeed conveyor. After the arms have been raised midway to their next higher level, half angle switch 282 is closed placing the lower input terminal of AND circuit 413 in a "1" state. With both input terminals of circuit 413 in a "1" state a "1" state is produced at its output and at input C of pulse generator 384. This "1" state also is presented at the input of solenoid control circuit 353, which energizes solenoid 470 to close valve 502. Closing valve 502 stops motor 104 with arms 100, 102 raised only to their half angle positions. It will be recalled that with the arms in their half angle positions, they are out of horizontal alignment with the rollers on the infeed conveyer, permitting movement of the elevator frame transversely of the infeed ends of the racks.

As arms 100, 102 raise a pallet from the infeed conveyor, arms 200 on the transfer mechanism are lowered to lower a pallet. When arms 200 reach their midway, or half angle positions, switch 322 is closed placing the upper input terminal of AND circuit 418 in a "1" state. With both input terminals of circuit 418 in a "1" state, a "1" state exists at its output and at the input terminals of pulse generator 392 and solenoid control circuit 359. This energizes solenoid 486 to close valve 508. Closing of valve 508 stops arms 200 in their half angle positions, out of horizontal alignment with the rollers on the outfeed conveyer.

Referring again to AND circuit 413, the "1" state produced at its output produces a long duration pulse at output D of pulse generator 384 and at the upper input of OR circuit 432. This produces a "1" state at the output of circuit 432 and at the input of solenoid control circuit 355, which energizes solenoids 472, 474. Energizing solenoid 474 retracts ram 168 to free the elevator for travel along its associated rail, and energizing of solenoid 472 actuates motor 58 to initiate movement of the elevator along the track toward the next adjacent set of racks in the kiln. In the embodiment illustrated the elevator would be moved from its position adjacent the set of racks indicated at 18a in FIG. 1 to a position aligned with the set of racks 18b.

Similarly, the previously-mentioned "1" state produced at the output of AND circuit 418 produces a log duration pulse at the output D of pulse generator 392 and at the upper input terminal of OR circuit 438. This produces a "1" state at the output of circuit 438 and at the input of solenoid control circuit 361, which energizes solenoid 488. Energizing solenoid 488 initiates movement of the transfer mechanism in the same direction as the elevator is moved by motor 58.

Upon initiation of movement of the elevator and transfer mechanism, the feeler arms of switches 260, 270 move off their associated cams on the tracks, and switches 260B, 270 close and switch 260A opens. Switches 260B, 270 remain closed and produce "1" states at the inputs of their respective OR circuits to maintain operation of motors 58 and 184 until such time as the feeler arms of the switches ride up and onto the next set of cams on the tracks to indicate that the elevator and transfer mechanism are properly aligned with the infeed and outfeed ends, respectively, of the next adjacent set of racks in the kiln. Switches 260B, 270 then open, motors 58 and 184 stop, and solenoid 474 is deenergized extending ram 168 to lock the elevator in position adjacent the infeed end of the set of racks.

When switch 260B is opened 260A closes, again producing a "1" state at input F of the counter and input C of pulse generator 381. Such signal produces a "1" state pulse at input K of reset circuit 456 to reset the stepper to its first step. When the stepper is reset conductor 558 returns to a "0" state placing a "0" state on one of the inputs of each of AND circuits 413, 418. This deenergizes solenoids 470, 486.

With solenoid 470 deenergized, valve 502 is opened, permitting motor 104 to resume raising arms 100, 102 to the next higher position, whereby they are aligned with the racks in the kiln. When solenoid 486 is deenergized, valve 508 opens to permit motor 206 to resume operation to lower arms 200 until they are in proper position to receive pallets discharged from the outfeed ends of the racks.

With the elevator and transfer mechanism thus moved to the next adjacent set of racks in the kiln they are properly positioned to fill such set of racks with new block-laden pallets.

Generally the apparatus described would begin operating at the lowermost rack in a set (such as set 18a in FIG. 1), and operate to fill successively higher racks until it fills the uppermost rack in the set. The stepper switch then would dictate that the elevator and transfer mechanism be shifted transversely of the infeed and outfeed ends of the racks, respectively, to the next adjacent set of racks in the kiln (set 18b in FIG. 1). With the shifter carriage in its uppermost position, prior to the elevator being shifted transversely, switch 296 is closed and switch 294 is opened. Thereafter, with the elevator shifted transversely of the ends of the racks to a position adjacent said next set of racks (18b), the shifter will be operated to load a rack and then will be moved downwardly to a position substantially in axial alignment with the next lower rack in the set to fill it. Such lowering of the carriage is initiated by a "1" state being produced at both input terminals of AND circuit 414, (by switch 296 being closed), at the input of pulse generator 386, at the upper input terminal of OR circuit 434, and the input of solenoid control circuit 356. This energizes solenoid 476 to start motor 160 to lower the carriage. When the carriage begins to lower switch 288 is closed and is held closed until the carriage is aligned with the next lower rack. Similarly, lowering of the receiver carriage, in conjunction with lowering of the shifter carriage, is accomplished by a "1" state being produced at both inputs of AND circuit 420, at the input of pulse generator 394, at the upper input of OR circuit 440, and at the input of solenoid control circuit 362. This energizes solenoid 490 to start motor 230 to lower the receiver carriage. Switch 326 is closed when the receiver carriage starts down, and remains closed until the receiver carriage is aligned with the next lower rack.

After the shifter has filled each successively lower rack in this set (18b) and is at its lowest point, switch 294 is closed, switch 296 is opened, and the stepper switch dictates movement to the next, or third, set or racks (18c) in the kiln. After the elevator and transfer mechanism are moved to the third set of racks the shifter is operated to fill first the lowest, and thereafter successively higher racks in such third set of racks. This sequence then is repeated until all racks are filled with new pallets.

When the apparatus is operating to fill successively lower racks in a set lowering of receiver carriage 212 to the next lower rack presents a problem, in that when arms 200 of the transfer mechanism are filled they must lower two block-laden pallets onto the outfeed conveyer, to clear the area between the receiver arms 220 and the racks, before the receiver arms may be extended. This is accomplished by the inclusion of hold circuit 460. A "1" state signal from the output terminal of OR circuit 440 which lowers the receiver carriage also is transmitted to input terminal L of circuit 460. This, in turn, produces a "1" state at the output terminal N of circuit 460 which is transmitted through conductor 600 to inhibit input terminal I of solenoid control circuit 372. This "1" state at terminal I of circuit 372 prevents the receiver ram from extending until the inhibit "1" state is removed. Input terminal M of circuit 460 receives a "1" state signal through conductor 588 each time switches 312, 314 are opened and closed, and thus, each time a pallet is lowered onto the outfeed conveyor and carried away from the transfer mechanism. After two pallets have been so lowered, the "1" state at output terminal N ceases, removing the "1" state signal from inhibit input terminal I of solenoid control circuit 372, permitting the receiver ram to extend arms 220.

With the apparatus described, block-laden pallets conveyed thereto on an infeed conveyor may be lifted in succession directly from such conveyor and loaded in a substantially continuous, single file stream onto a selected rack in a stacked set of racks. After a rack has been filled, the next higher, or lower, rack may be filled also in a substantially continuous, single file stream. After all racks in a selected set have been filled, the apparatus moves to the next adjacent set to fill the racks in that set.

The automatic control circuit described produces loading of successively higher racks in one set of racks, shifting of the mechanism to the next adjacent set of racks, and loading successively lower racks in such adjacent set. In this manner, racks may be loaded in what may be termed a serpentine series, filling successively higher racks in one set, moving to the next adjacent set and loading successively lower racks, and then moving to the next set and loading successively higher racks. This contributes to the speed with which the apparatus may function to load adjacent sets of racks.

Further, the construction of the apparatus is such that the arms on the infeed elevator need be spaced apart vertically only a slightly greater distance than the height of the blocks and pallet which they are to load. With this construction, more rapid loading may be achieved.

While a specific embodiment of the invention has been described herein, it should be appreciated that variations and modifications are possible without departing from the spirit of the invention.

It is claimed and desired to secure by Letters Patent:

1. Apparatus for loading articles in a substantially continuous single-file stream onto a selected one of a set of elongated, vertically stacked racks adapted to receive such articles at an infeed set of their ends comprising an elongated infeed conveyor disposed below and extending generally transversely of and adjacent the infeed ends of the racks for moving articles substantially horizontally and in succession toward said infeed ends of the racks, an elevator adjacent the infeed ends of the racks and said conveyor operable to remove articles in succession directly from said conveyor and raise them to positions substantially in axial alignment with a selected one of the racks, a vertically movable shifter mounted adjacent said elevator, adjustable selectively to at least two different vertically spaced positions, each generally in axial alignment with a different one of said racks, said shifter being operable, when in a position aligned with a selected rack and with an article on said elevator in alignment axially with said selected rack, to shift the article laterally from the elevator onto the adjacent infeed end of the rack, an power-operated adjustment means connected to said shifter for moving the shifter between said two positions.

2. The apparatus of claim 1, which further comprises means for sensing the number of articles shifted by the shifter onto a rack with the shifter in one of its said positions, and means operatively connected to said sensing means operable, after a preselected number of articles have been shifted onto the rack, to adjust the position of said shifter vertically to its other position.

3. The apparatus of claim 1, which further comprises a counter for counting the number of articles shifted by said shifter in one of its said positions, and power-operated means responsive to the count of said counter operatively connected to said shifter, operable to move the shifter to its other position after the counter has counted the successive shiftings by said shifter in its said one position of a preselected number of articles.

4. The apparatus of claim 1 wherein there is another set of elongated, vertically stacked racks disposed laterally adjacent said first-mentioned set, with each rack in said other set at substantially the same elevation as a rack in the first-mentioned set, said shifter and elevator are mounted for movement laterally of the ends of such racks, and which further comprises power-operated means operatively connected to said shifter and elevator operable to move the same laterally of said ends of the racks from positions adjacent the ends of the racks in one set to positions adjacent the ends of the racks in the other set.

5. The apparatus of claim 4, wherein said shifter is adjustable to a different position adjacent each rack in a set for shifting articles onto the rack whereby a preselected number of articles may be loaded onto different racks in a set, and which further comprises means operatively connected to said shifter and to said power-operated means for sensing when said shifter has loaded said preselected number onto racks in a set and, upon sensing this, for actuating said power-operated means thus to move the shifter and elevator into positions adjacent the infeed set of ends of the other set of racks.

6. The apparatus of claim 2, wherein said sensing means comprises a counter circuit actuated by each shifting action of said shifter.

7. The apparatus of claim 5, wherein said adjustment means comprises a reversible motor, which is operable to raise the shifter to different positions to load successively higher racks when adjacent one set of racks, and upon the shifter and elevator being moved into a position adjacent the other set of racks, is operable to lower the shifter to different positions to load successively lower racks in said other set.

8. The apparatus of claim 1, wherein said racks have an outfeed set of ends from which articles may be discharged, and which further comprises an outfeed conveyor spaced vertically from said racks operable to move articles substantially horizontally and in succession away from said outfeed ends, and transfer means disposed intermediate said outfeed ends and the outfeed conveyor, said transfer means including means operable to receive articles discharged from the racks and to shift them vertically onto said outfeed conveyor.

9. The apparatus of claim 8, wherein said transfer means comprises a vertically movable article receiver mounted for selective adjustment to different vertically spaced positions, each generally in alignment with the outfeed end of a different one of said racks, motor means connected to said receiver for moving the same between said different positions, and control means interconnecting said adjustment means for said shifter and the motor means for said receiver operable to produce adjustment of said receiver, whereby it is maintained adjacent the outfeed end of the same rack with which the shifter is aligned.

10. The apparatus of claim 9, wherein there is another set of elongated, vertically stacked racks disposed adjacent and laterally of said first-mentioned set, with each rack in said other set at substantially the same elevation as a rack in the first-mentioned set, said shifter and elevator are mounted for movement laterally of the infeed ends of such racks, said receiver is mounted for movement laterally of the outfeed ends of such racks, and which further comprises power-operated means operatively connected to the shifter and elevator for moving the same laterally of said racks from positions adjacent one set of racks to a position adjacent the other set, power-operated means operatively connected to said receiver for moving the same laterally of said racks from a position adjacent one set of racks to a position adjacent the other set, and control means interconnecting the power-operated means for moving said shifter and elevator and the power-operated means for moving the receiver, which control means is operable to produce corresponding actuation of both of said power-operated means, whereby the shifter and receiver are positioned at the infeed and outfeed ends, respectively, of the same set of racks.

11. The apparatus of claim 1, wherein said infeed conveyor comprises a plurality of horizontally spaced supports for supporting the underside of an article moved therealong, and said elevator comprises arms movable upwardly between said supports, operable to engage the underside of an article and lift it directly from said supports.

12. The apparatus of claim 11, wherein said elevator further comprises chain means having a substantially upright vertically movable reach spaced from the infeed ends of the racks, motor means operatively connected to said chain means operable to produce vertical movement of said reach, and said arms are mounted on said reach for movement vertically therewith, the arms projecting substantially horizontally outwardly from said reach in the direction of the infeed ends of the racks.

13. The apparatus of claim 12, wherein said arms are spaced apart vertically on said reach a distance slightly greater than the height of an article to be lifted by the elevator.

14. The apparatus of claim 11, wherein said elevator further comprises a pair of chains having substantially parallel, laterally spaced, upright reaches spaced from the infeed ends of the racks, said arms being mounted on said reaches with the arms spaced apart vertically on said reaches and projecting substantially horizontally outwardly therefrom in the direction of the infeed ends of the racks, and motor means connected to said chains for producing synchronized vertical movement of said reaches, whereby an arm on said reach of one chain moves substantially parallel and is maintained substantially in a common horizontal plane with an arm on said reach of the other chain.

15. The apparatus of claim 14, wherein the shifter comprises an extensible-contractible ram disposed with its longitudinal axis extending substantially parallel to the racks, said arms of the elevator extend between said ram and the infeed ends of said racks, and the ram is operable, on being extended to shove an article off said arms and onto a rack.

16. The apparatus of claim 1, wherein there is another set of elongated vertically stacked racks disposed adjacent and laterally of said first-mentioned set, and which further comprises a substantially upright traveling frame mounted for movement laterally of the infeed ends of the racks in said sets, and said shifter is mounted on a vertically shiftable carriage carried on said traveling frame.

17. Apparatus for loading articles in a substantially continuous single-file stream onto a selected one of a set of elongated, vertically stacked racks adapted to receive such articles at an infeed set of their ends comprising an elongated infeed conveyor disposed below and extending generally transversely of and adjacent the infeed ends of the racks for moving articles substantially horizontally and in succession toward said infeed ends of the racks, said infeed conveyor including a plurality of horizontally spaced supports adapted to support the underside of an article moved therealong, an elevator adjacent the infeed ends of the racks including chain means having a substantially upright vertically movable reach, motor means operatively connected to said chain means for driving it whereby said reach moves upwardly, and vertically spaced, elongated arms mounted on said reach and projecting substantially horizontally therefrom in the direction of said racks, said arms being operable, on upward movement of said reach to engage the underside of an article supported on said supports, lift such article directly from the supports, and raise it to a position substantially in axial alignment with one of said racks, and a vertically movable shifter mounted adjacent said elevator, adjustable selectively to at least two different vertically spaced positions, each generally in axial alignment with a different one of said racks, said shifter being operable, when in a position aligned with a selected rack and with an article on said elevator in alignment axially with said selected rack, to shift the article laterally from the elevator and onto the adjacent infeed end of the rack.

18. The apparatus of claim 17, wherein there is another set of elongated, vertically stacked racks disposed adjacent and laterally of said first-mentioned set, and which further comprises a substantially upright traveling frame mounted for movement laterally of the infeed ends of the rack in said sets, and said shifter and elevator are mounted on said traveling frame for movement therewith.

19. Apparatus for loading articles in a substantially continuous single-file stream onto the infeed end of a rack comprising an elongated infeed conveyor disposed below and extending generally transversely of and adjacent the infeed end of the rack for moving articles substantially horizontally and in succession toward said infeed end of the rack, said conveyor including a plurality of horizontally spaced supports adapted to support the underside of an article moved therealong, an elevator adjacent the infeed end of the rack and the conveyor including an elongated, substantially horizontal, vertically movable arm and power-operated means operatively connected to said arm operable to raise the arm from a lowered position below the level of said supports upwardly between an adjacent pair of said supports, and to a position substantially in axial alignment with the end of the rack, for picking an article up from said conveyor and raising it into axial alignment with the rack, and a shifter mounted adjacent and substantially in axial alignment with the rack, said shifter being operable, with an article on said elevator in alignment with the rack, to shift the article laterally from the elevator and onto the infeed end of the rack.

20. The apparatus of claim 19, wherein said elevator further comprises chain means having a substantially upright, vertically movable reach adjacent the conveyor and infeed end of the rack, said power-operated means comprises a motor operatively connected to said chain means operable to produce vertical movement of its said reach, and said arm is mounted on said reach for movement therewith.

* * * * *